(12) United States Patent
Kohigashi et al.

(10) Patent No.: US 11,582,910 B2
(45) Date of Patent: Feb. 21, 2023

(54) LAWN MOWER HAVING IMPROVED DISCHARGE CONTAINMENT

(71) Applicant: HONDA MOTOR CO., LTD., Tokyo (JP)

(72) Inventors: Kenta Kohigashi, Saitama (JP); Nobuo Yamazaki, Saitama (JP); Hajime Yoshimura, Saitama (JP); Makoto Uchimi, Saitama (JP); Ryota Hisada, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 198 days.

(21) Appl. No.: 16/803,586

(22) Filed: Feb. 27, 2020

(65) Prior Publication Data

US 2020/0305349 A1 Oct. 1, 2020

(30) Foreign Application Priority Data

Mar. 28, 2019 (JP) .............................. JP2019-062678

(51) Int. Cl.
  *A01D 34/71* (2006.01)
  *A01D 43/063* (2006.01)
  *A01D 34/68* (2006.01)

(52) U.S. Cl.
  CPC ......... *A01D 43/0636* (2013.01); *A01D 34/68* (2013.01); *A01D 34/71* (2013.01)

(58) Field of Classification Search
  CPC .............. A01D 43/073; A01D 43/0636; A01D 43/0635; A01D 43/0633; A01D 43/06; A01D 43/063; A01D 43/0638; A01D 43/0631; A01D 2101/00; A01D 34/68; A01D 34/71; A01D 34/667; A01D 34/81
  See application file for complete search history.

(56) References Cited

U.S. PATENT DOCUMENTS 4,151,702 A * 5/1979 Brown ............... A01D 43/0631
                                                56/203
4,592,469 A * 6/1986 Gaither ................ A01D 43/063
                                                206/395

(Continued)

FOREIGN PATENT DOCUMENTS

GB        2414914 A * 12/2005 ........... A01D 43/063
JP        S63-061223 A    4/1988

*Primary Examiner* — Adam J Behrens
(74) *Attorney, Agent, or Firm* — Paratus Law Group, PLLC

(57) ABSTRACT

A lawn mower includes a cutter blade that cuts grass; a body portion including a housing containing the cutter blade, and a grass clippings discharge passage that discharge grass clippings cut by the cutter blade from the housing; a grass clippings container detachably attached to the body portion, and a slide device. The grass clippings discharge passage includes an upstream opening connected to the housing, and a downstream opening for ejecting grass clippings to outside of the body portion. The grass clippings container includes an opening opened toward the body portion and connected to the body portion, an end surface facing the opening, and a side surface extending from the opening to the end surface. The slide device adjusts a distance between the downstream opening of the grass clippings discharge passage and the end surface of the grass clipping container.

4 Claims, 9 Drawing Sheets

(56) References Cited

U.S. PATENT DOCUMENTS

| | | | | |
|---|---|---|---|---|
| 4,598,536 A | * | 7/1986 | Langley | A01D 43/06 56/16.6 |
| 5,152,128 A | * | 10/1992 | Stoican | A01D 43/0635 56/203 |
| 6,546,710 B1 | * | 4/2003 | DeHart | A01D 43/063 56/202 |
| 7,013,627 B2 | * | 3/2006 | Hebbard | A01D 43/063 56/202 |
| 2011/0197560 A1 | * | 8/2011 | Suhara | A01D 43/0635 56/202 |

* cited by examiner

LAWN MOWER HAVING IMPROVED DISCHARGE CONTAINMENT

CROSS-REFERENCE TO RELATED APPLICATIONS

The present application claims the benefit of priority of Japanese Patent Application No. 2019-062678, filed on Mar. 28, 2019, the content of which is incorporated herein by reference.

TECHNICAL FIELD

Aspects of the present invention relate to a lawn mower.

BACKGROUND ART

There has been known a lawn mower including a cutler blade attached rotatable thereto, a body portion including a housing that contains the cutter blade, and a grass clippings container. Grass clippings cut by the cutter blade are ejected to the outside of the body portion from the housing.

For example, JP-UM-A-S63-061223 discloses a lawn mower including a grass clippings discharge passage that discharges grass clippings cut by a cutter blade from a housing to a rear surface of a body portion. Grass clippings cut by the cutter blade are contained in a grass clippings container through the grass clippings discharge passage from the housing. The grass clippings container is detachably attached to the rear surface of the body portion.

The grass clippings discharge passage of the lawn mower in JP-UM-A-S63-061223 includes an upstream opening connected to the housing and a downstream opening opened to the rear surface of the body portion. The grass clippings container covers the downstream opening of the grass clippings discharge passage and is opened toward the body portion.

In the lawn mower of JP-UM-A-S63-061223, grass clippings cut by the cutter blade may be unevenly distributed in the vicinity of the opening of the grass clippings container when being contained in the grass clippings container.

SUMMARY

Accordingly, an aspect of the present invention provides a lawn mower capable of reducing uneven distribution of grass clippings contained in a grass clippings container in the vicinity of an opening of the grass clippings container.

According to an embodiment of the present invention, there is provided a lawn mower includes:
a power source;
a rotation shaft configured to be rotated by power of the power source;
a cutter blade configured to be rotated by the rotation shaft so as to cut grass;
a body portion including a housing containing the cutter blade, and a grass clippings discharge passage configured to discharge grass clippings cut by the cutter blade from the housing;
a grass clippings container detachably attached to the body portion and configured to contain grass clippings; and
a slide device,
wherein the grass clippings discharge passage includes:
an upstream opening connected to the housing; and
a downstream opening for discharging grass clippings to outside of the body portion,
wherein the grass clippings container
is provided to cover the downstream opening of the grass clippings discharge passage,
includes an opening opened toward the body portion and connected to the body portion, an end surface facing the opening, and a side surface extending from the opening to the end surface, and
is configured to contain grass clippings discharged from the downstream opening of the grass clippings discharge passage, and
wherein the slide device is configured to adjust a distance between the downstream opening of the grass clippings discharge passage and the end surface of the grass clipping container.

According to the above configuration, the distance between the downstream opening of the grass clippings discharge passage and the end surface of the grass clippings container can be adjusted by the slide device. Accordingly, as the amount of grass clippings contained in the grass clippings container increases, the distance between the downstream opening of the grass clippings discharge passage and the end surface of the grass clippings container is adjusted to gradually increase. Therefore, uneven distribution of grass clippings can be reduced in the vicinity of the opening of the grass clippings container. Further, grass clippings can accumulate in the vicinity of the end surface of the grass clippings container without increasing a rotation speed of the cutter blade to increase blow speed, and thus noise can be reduced and energy consumption can be reduced.

DESCRIPTION OF EMBODIMENTS

Figure 1:
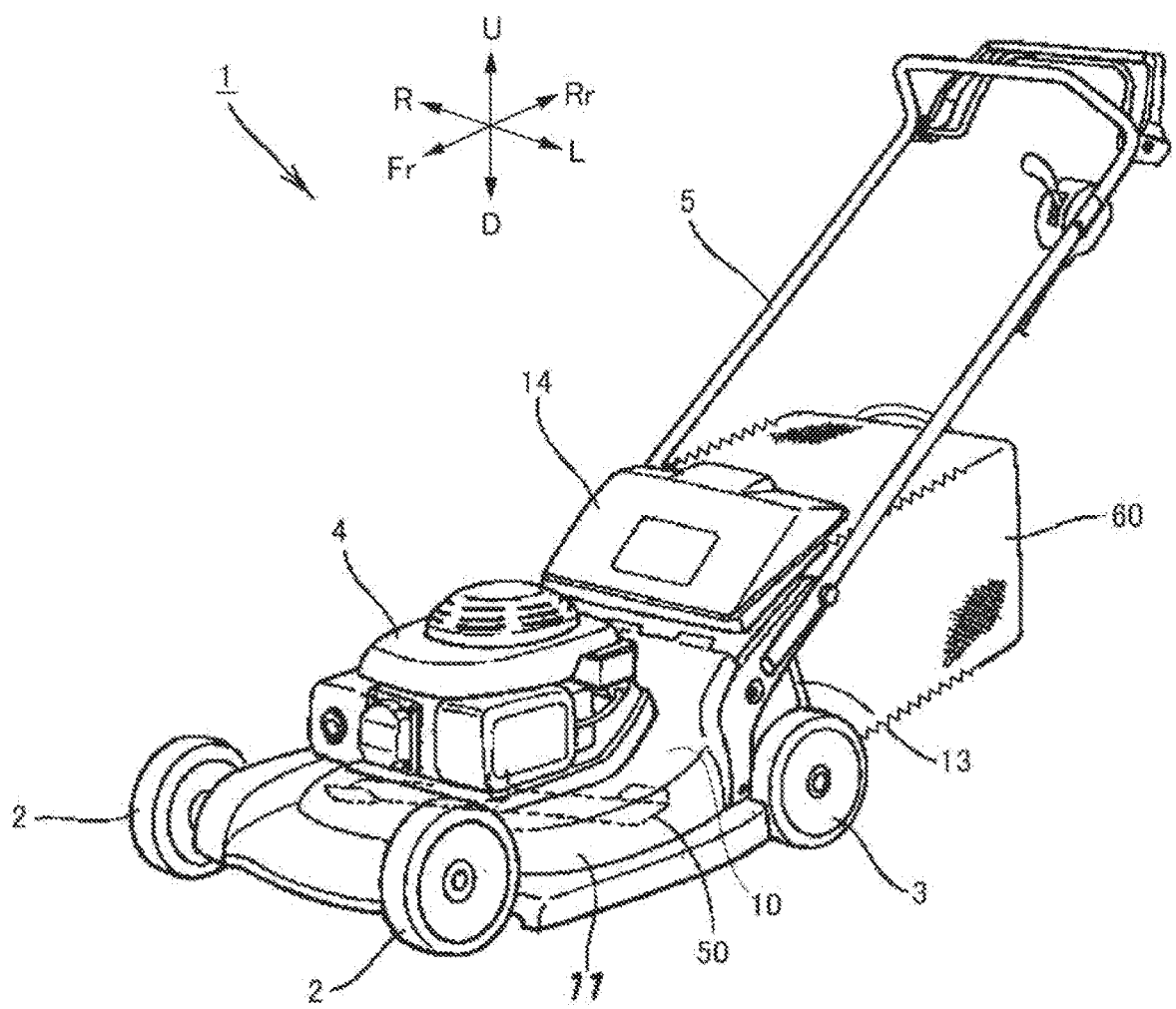
FIG. 1 is a perspective view of a lawn mower according to a first embodiment of the present invention.

A lawn mower according to embodiments of the present invention will be described below with reference to the accompanying drawings. In the drawings, front, rear, left, right, upper, and lower sides follow a direction from which an operator takes views and a front side relative to a lawn mower 1 is denoted by Fr, a rear side is denoted by Rr, a left side is denoted by L, a right side is denoted by R, an upper side is denoted by U, and a lower side is denoted by D, respectively. The drawings are viewed in a direction of the reference numerals.

First Embodiment

First, a lawn mower according to the first embodiment of the present invention will be described with reference to FIGS. 1 to 5B.

Figure 2:
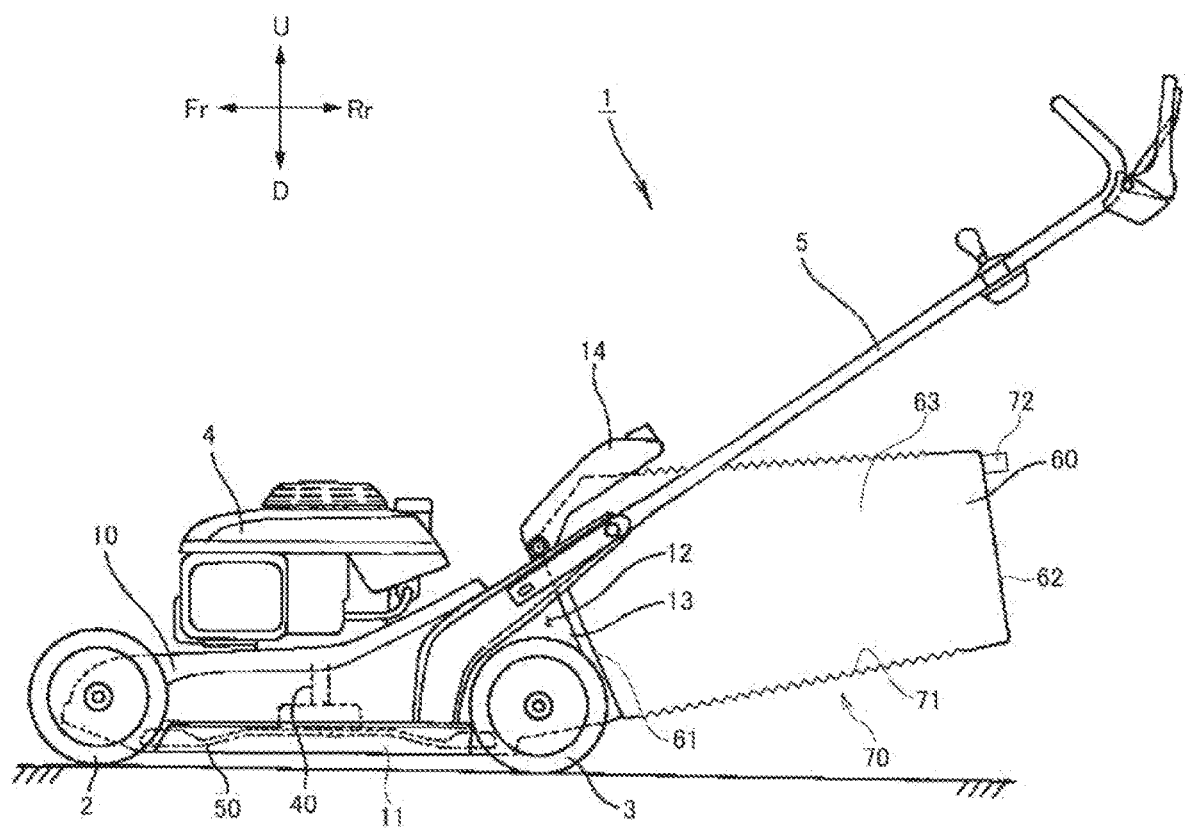
FIG. 2 is a left view of the lawn mower in FIG. 1.

As shown in FIGS. 1 and 2, the lawn mower 1 according to the present embodiment includes a body portion 10 serving as a mower body, a pair of left and right front wheels 2 provided at a front portion of the body portion 10, a pair of left and right rear wheels 3 provided at a rear portion of the body portion 10 (only the left wheel is shown in FIGS. 1 and 2), an engine 4 serving as a power source provided on an upper portion of the body portion 10, and an operation handle 5 extending upward and rearward from the rear portion of the body portion 10. The lawn mower 1 is moved by the operator operating the operation handle 5.

An output shaft 40 that is rotated by the power of the engine 4 extends substantially vertically downward from the engine 4. The output shaft 40 is provided with a cutter blade 50 at a lower end thereof and the cutter blade 50 cuts grass by rotating about the output shaft 40.

The body portion 10 includes a housing 11 that is opened downward and contains the cutter blade 50, and a grass clippings discharge passage 12 that discharges grass clippings cut by the cutter blade 50 from the housing 11.

The grass clippings discharge passage 12 includes an upstream opening 121 connected to the housing 11 and a downstream opening 122 that is opened rearward from a rear surface of the body portion 10. Grass clippings cut by the cutter blade 50 are ejected to the outside of the body portion 10 from the downstream opening 122.

The body portion 10 includes a container attachment portion 13 on the rear surface thereof. To the container attachment portion 13, a grass clippings container 60 such as a grass bag is detachably attached so as to cover the downstream opening 122 of the grass clippings discharge passage 12. The grass clippings container 60 contains grass clippings ejected to the outside of the body portion 10 from the downstream opening 122 of the grass clippings discharge passage 12.

The grass clippings container 60 has a substantially rectangular parallelepiped shape that is opened toward the rear surface of the body portion 10. The grass clippings container 60 includes an opening 61 that is opened toward the rear surface of the body portion 10 and is connected to the container attachment portion 13 provided on the rear surface of the body portion 10, an end surface 62 facing the opening 61, and a side surface 63 extending from the opening 61 to the end surface 62. The end surface 62 has a substantially rectangular shape and the side surface 63 has a substantially rectangular shape whose cross section has substantially the same shape as the end surface 62.

The rear surface of the body portion 10 is provided with an opening cover 14 that closes the downstream opening 122 of the grass clippings discharge passage 12 when the grass clippings container 60 is detached. In the present embodiment, the opening cover 14 is rotatable up and down about an upper end of the opening cover 14 serving as a rotation shaft.

Figure 3:
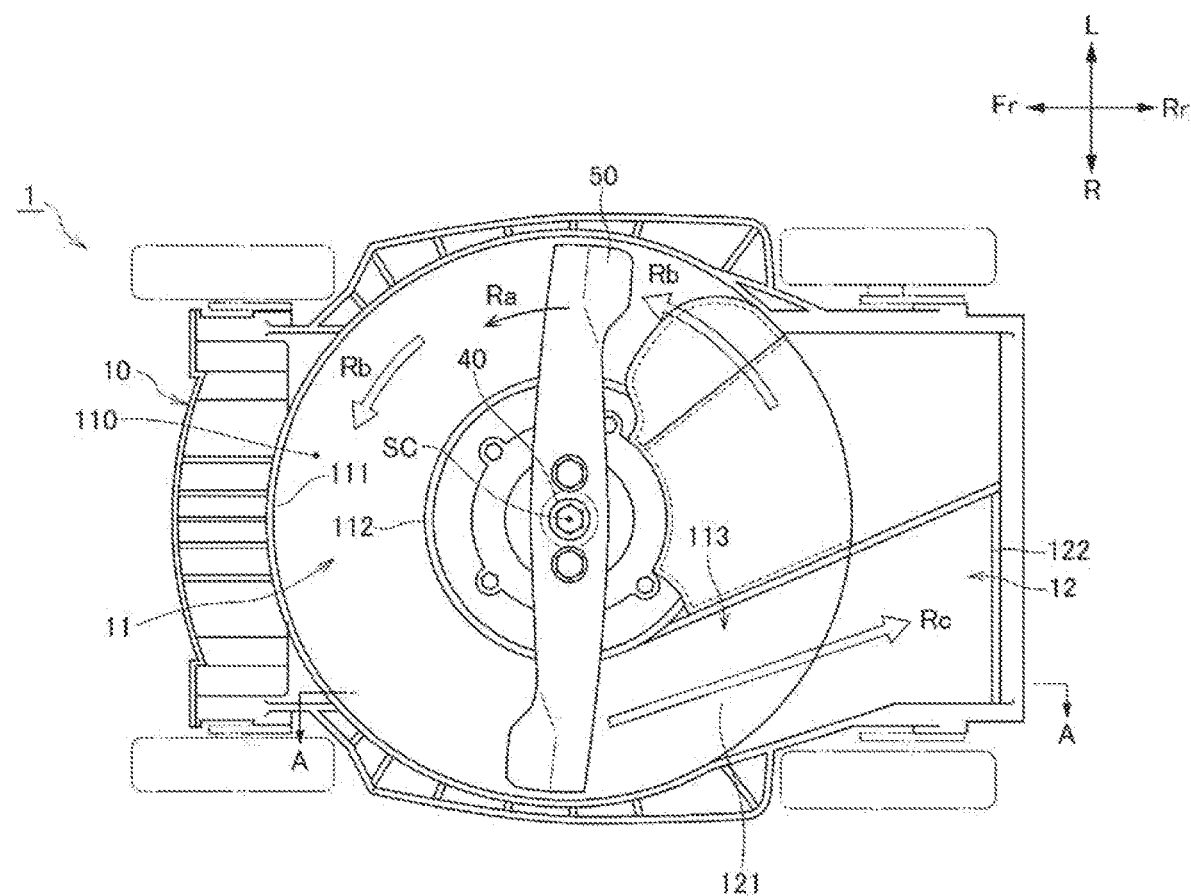
FIG. 3 is a bottom view of the lawn mower in FIG. 1.
Figure 4:
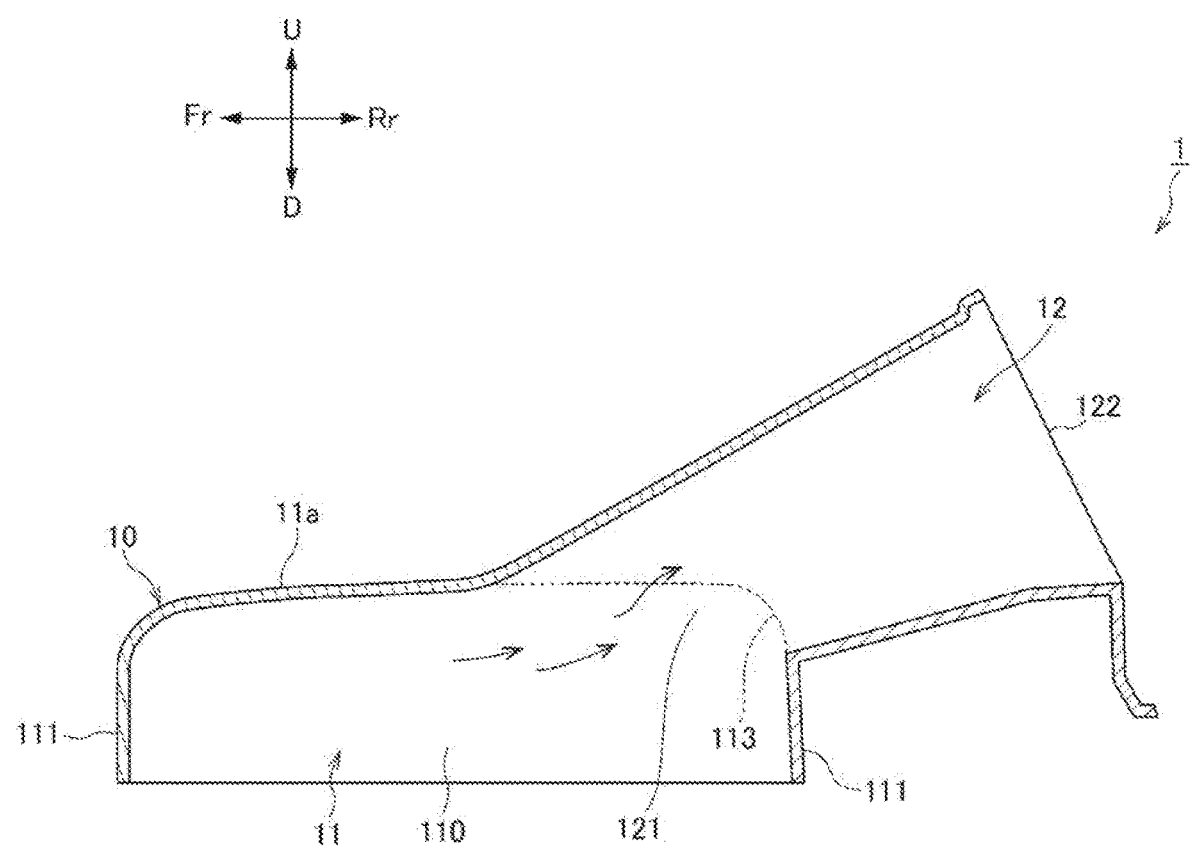
FIG. 4 is a cross-sectional view taken along a line A-A in FIG. 3.

As shown in FIGS. 3 and 4, the housing 11 includes a spiral scroll portion 110 that is substantially concentric with a shaft center SC of the output shaft 40. The scroll portion 110 is a space surrounded by a top plate 11a of the housing 11, an outer cylinder portion 111 that is concentric with the shaft center SC of the output shaft 40, and an inner cylinder portion 112 that is concentric with the shall center SC and has a smaller diameter than the outer cylinder part 111.

The scroll portion 110 includes a passage opening 113 in a right rear portion thereof and the passage opening 113 is opened upward and rearward. The passage opening 113 is connected to the upstream opening 121 of the grass clippings discharge passage 12. The grass clippings discharge passage 12 extends rearward in a substantially tangential direction of the outer cylinder portion 111 of the scroll portion 110 as viewed from an upper-lower direction and extends rearward and upward as viewed from a left-right direction. The downstream opening 122 of the grass clippings discharge passage 12 is on a right end side of the rear surface of the body portion 10.

The cutter blade 50 is rotated counterclockwise about the rotation shaft 40 by the power of the engine 4 as viewed a bottom surface of the lawn mower 1, that is, in a direction of an arrow Ra. The cutter blade 50 cuts grass by rotating in the direction of the arrow Ra and generates a counterclockwise turning flow in the housing 11 as viewed from the bottom surface of the lawn mower 1, that is, in a direction of an arrow Rb.

Grass clippings cut by the cutter blade 50 turn the scroll portion 110 of the housing 11 by the turning flow and are discharged to the downstream opening 122 of the grass clippings discharge passage 12 in a direction of an arrow Rc through the grass clippings discharge passage 12. Grass clippings are then ejected to the outside of the body portion 10 and contained in the grass clippings container 60.

The lawn mower 1 further includes a slide device 70 that adjusts a distance between the downstream opening 122 of the grass clippings discharge passage 12 and the end surface 62 of the grass clippings container 60.

Figure 5A:
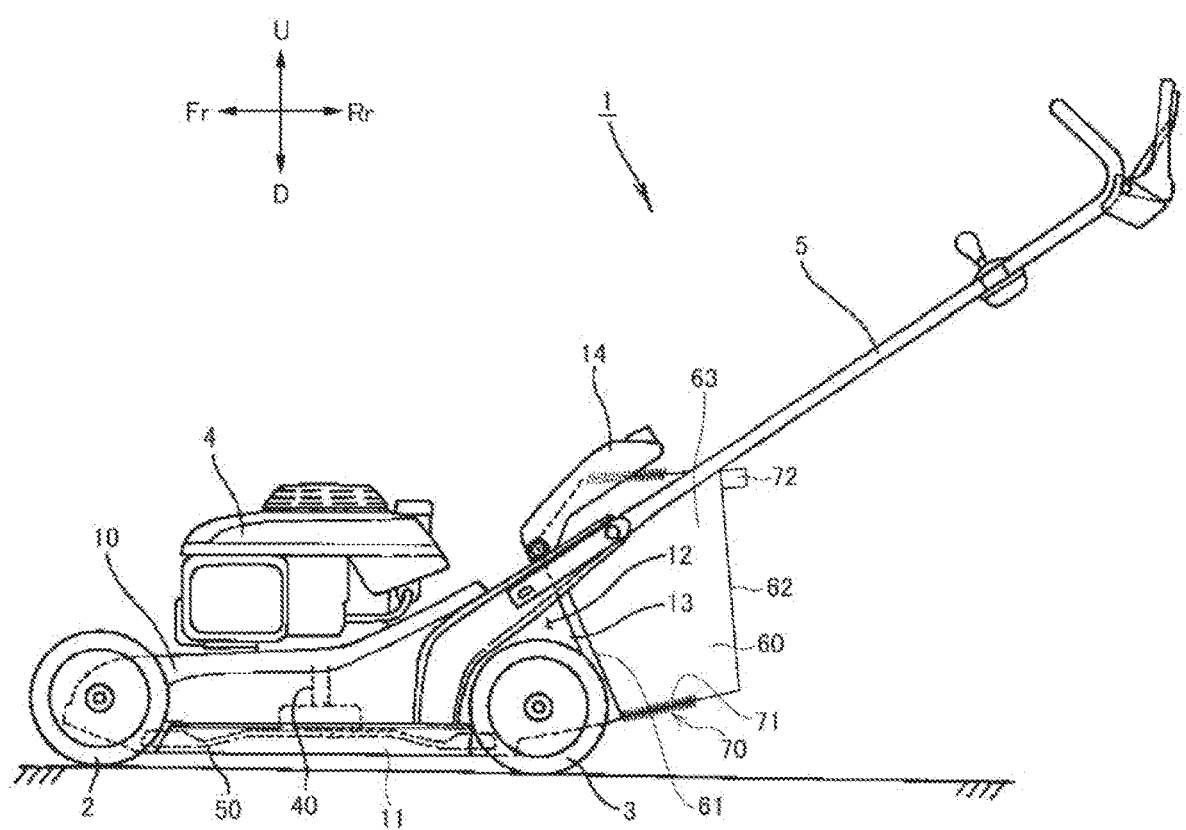
FIG. 5A is a left view of the lawn mower in a state in which a grass clippings container is substantially empty.
Figure 5B:
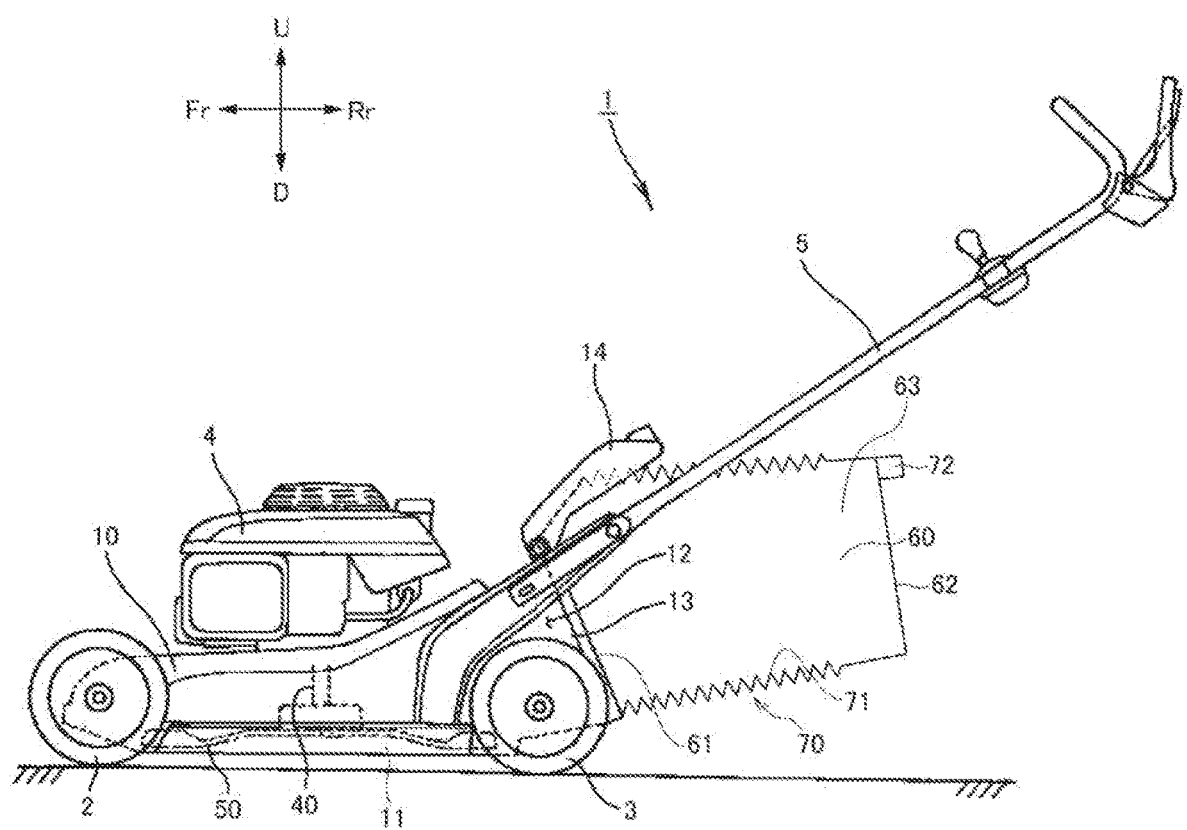
FIG. 5B is a left view of the lawn mower in a state in which grass clippings are contained in the grass clippings container.

As shown in FIGS. 2, 5A, and 5B, the slide device 70 according to the present embodiment, which is provided on the side surface 63 of the grass clippings container 60, includes an expandable portion 71 that expands and contracts a distance between the opening 61 and the end surface 62 of the grass clippings container 60, and a grip portion 72 provided on the end surface 62 of the grass clippings container 60. The expandable portion 71 has, for example, a bellows mechanism.

When the operator of the lawn mower 1 grips and pulls the grip portion 72 rearward, the expandable portion 71 expands, the end surface 62 of the grass clippings container 60 slides rearward, and the distance between the downstream opening 122 of the grass clippings discharge passage 12 and the end surface 62 of the grass clippings container 60 increases. When the operator grips and pushes the grip portion 72 forward, the expandable portion 71 contracts, so that the end surface 62 of the grass clippings container 60 slides forward. Accordingly, the distance between the downstream opening 122 of the grass clippings discharge passage 12 and the end surface 62 of the grass clippings container 60 decreases. In this way, the slide device 70 can adjust the distance between the downstream opening 122 of the grass clippings discharge passage 12 and the end surface 62 of the grass clippings container 60 by expanding and contracting the expandable portion 71 provided on the grass clippings container 60.

Grass clippings cut by the cutter blade 50 fly by the turning flow due to the rotation of the cutter blade 50 and are ejected from the downstream opening 122 of the grass clippings discharge passage 12. Accordingly, grass clippings ejected from the downstream opening 122 of the grass clippings discharge passage 12 are likely to be unevenly distributed in the vicinity of the downstream opening 122 of the grass clippings discharge passage 12 in the grass clippings container 60.

As shown in FIG. 5A, for example, grass clippings are little contained in the grass clippings container 60 immediately after the lawn mower 1 starts operating and the grass clippings container 60 is almost empty. At this time, the grip portion 72 is pushed forward and the end surface 62 of the grass clippings container 60 is slid forward, so that the distance between the downstream opening 122 of the grass clippings discharge passage 12 and the end surface 62 of the grass clippings container 60 is adjusted to decrease.

In this way, grass clippings discharged from the downstream opening 122 of the grass clippings discharge passage 12 are accumulated in the vicinity of the end surface 62 of the grass clippings container 60.

Accordingly, grass clippings can be accumulated in the vicinity of the end surface 62 of the grass clippings container 60 without increasing a rotation speed of the cutter blade 50, and thus noise of the lawn mower 1 can be reduced and energy consumption can be reduced.

Then, when the amount of grass clippings contained in the grass clippings container 60 increases, as shown in FIG. 5B, the grip portion 72 is pulled rearward and the end surface 62 of the grass clippings container 60 is slid rearward, so that the distance between the downstream opening 122 of the grass clippings discharge passage 12 and the end surface 62 of the grass clippings container 60 is adjusted to increase.

Accordingly, grass clippings already contained in the grass clippings container 60 also slide rearward. In this state, grass clippings are not accumulated in the vicinity of the downstream opening 122 of the grass clippings discharge passage 12 in the grass clippings container 60. Then, grass clippings ejected from the downstream opening 122 of the grass clippings discharge passage 12 are contained in the vicinity of the downstream opening 122 of the grass clippings discharge passage 12 in the grass clippings container 60.

When the amount of grass clippings accumulated in the vicinity of the downstream opening 122 of the grass clippings discharge passage 12 in the grass clippings container 60 increases again, the grip portion 72 is further pulled rearward and the end surface 62 of the grass clippings container 60 is further slid rearward, so that the distance between the downstream opening 122 of the grass clippings discharge passage 12 and the end surface 62 of the grass clippings container 60 is further adjusted to increase.

Accordingly, grass clippings already contained in the grass clippings container 60 also slide rearward, so that grass clippings are not accumulated again in the vicinity of the downstream opening 122 of the grass clippings discharge passage 12 in the grass clippings container 60. Then, grass clippings ejected from the downstream opening 122 of the grass clippings discharge passage 12 are contained in the vicinity of the downstream opening 122 of the grass clippings discharge passage 12 in the grass clippings container 60.

In this way, as the amount of grass clippings contained in the grass clippings container 60 increases, the distance between the downstream opening 122 of the grass clippings discharge passage 12 and the end surface 62 of the grass clippings container 60 is adjusted to gradually increase. Accordingly, grass clippings ejected from the downstream opening 122 of the grass clippings discharge passage 12 can gradually accumulate in a position away from the end surface 62 of the grass clippings container 60.

Accordingly, uneven distribution of grass clippings contained in the grass clippings container 60 can be reduced in the vicinity of the opening 61 of the grass clippings container 60.

Since the distance between the downstream opening 122 of the grass clippings discharge passage 12 and the end surface 62 of the grass clippings container 60 can be adjusted by the operator of the lawn mower 1 gripping and pulling the grip portion 72 rearward or pushing the grip portion 72 forward, the distance between the downstream opening 122 of the grass clippings discharge passage 12 and the end surface 62 of the grass clippings container 60 can be adjusted according to preferences of the operator.

Although in the present embodiment, the distance between the downstream opening 122 of the grass clippings discharge passage 12 and the end surface 62 of the grass clippings container 60 is adjusted by the operator of the lawn mower 1 gripping and pulling the grip portion 72 rearward or pushing the grip portion 72 forward, the slide device 70 may also be interlocked with the pair of left and right front wheels 2 and/or the pair of left and right rear wheels 3 such that the end surface 62 of the grass clippings container 60 may be moved in the front-rear direction. For example, the end surface 62 of the grass clippings container 60 may be moved in the front-rear direction by a rack-and-pinion mechanism connected to a shaft of the rear wheels 3 of the lawn mower 1 via a speed reduction mechanism (not shown). In this way, the distance between the downstream opening 122 of the grass clippings discharge passage 12 and the end surface 62 of the grass clippings container 60 can be adjusted without the operation of the operator.

The lawn mower 1 may include an electric motor (not shown) such that the slide device 70 may be driven by the electric motor to move the end surface 62 of the grass clippings container 60 in the front-rear direction. In this way, since the distance between the downstream opening 122 of the grass clippings discharge passage 12 and the end surface 62 of the grass clippings container 60 can be adjusted independently of the operation of the operator, the distance between the downstream opening 122 of the grass clippings discharge passage 12 and the end surface 62 of the grass clippings container 60 can be adjusted in accordance with, for example, an accumulated traveling distance and drive time of the lawn mower 1.

Second Embodiment

Next, a lawn mower according to the second embodiment of the present invention will be described with reference to FIGS. 6 to 7B.

In the following description, the similar components to those of the lawn mower 1 according to the first embodiment are denoted by the same reference numerals and descriptions thereof are omitted or simplified. The slide device 70 of the lawn mower 1 according to the first embodiment, which is provided on the side surface 63 of the grass clippings container 60, includes the expandable portion 71 that expands and contracts the distance between the opening 61 and the end surface 62 of the grass clippings container 60, whereas the slide device 70 of the lawn mower 1 according to the second embodiment includes an extension portion 73 provided in the grass clippings discharge passage 12 such that the downstream opening 122 is extendable toward the end surface 62 of the grass clippings container 60. Hereinafter, differences between the slide device 70 according to the first embodiment and the slide device 70 according to the second embodiment will be described in detail.

Figure 6:
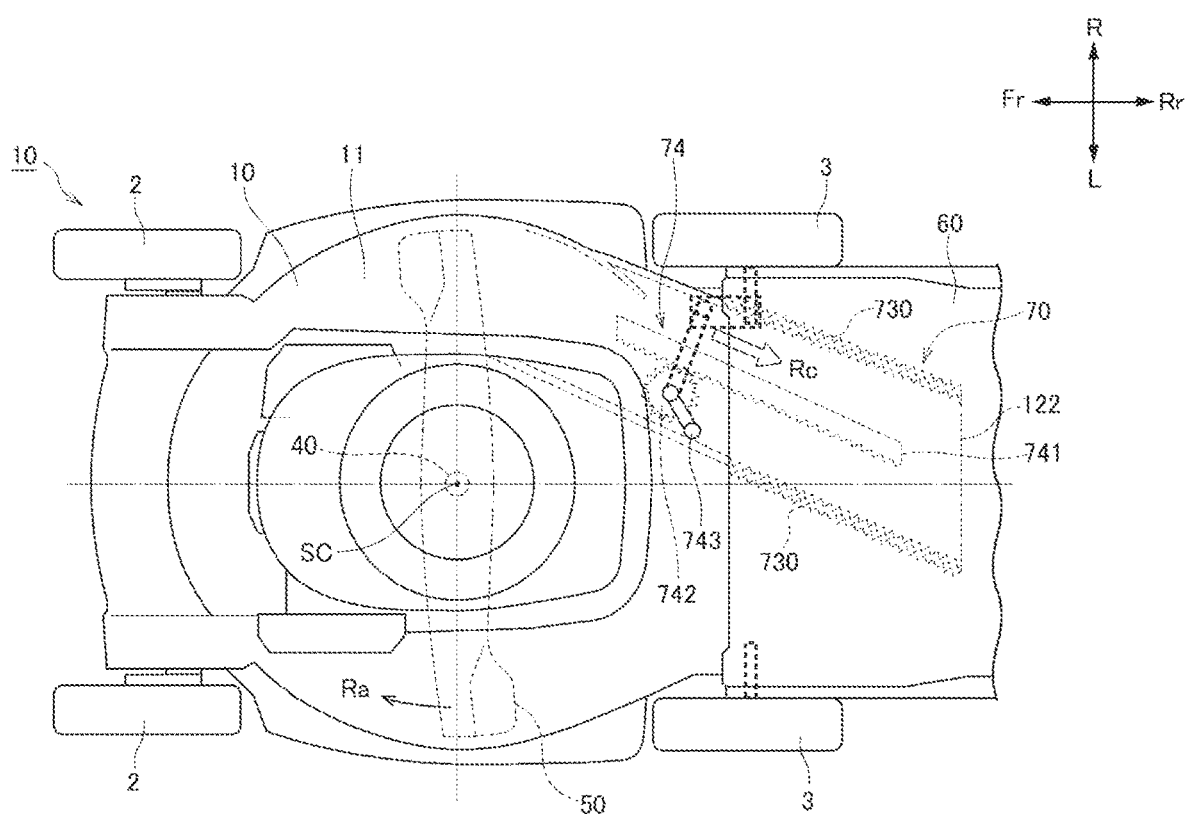
FIG. 6 is a top view of a lawn mower according to a second embodiment of the present invention.

As shown in FIG. 6, the slide device 70 according to the present embodiment, which is provided at downstream of the grass clippings discharge passage 12, includes the expandable extension portion 73 that expands rearward from a rear surface of the body portion 10, that is, toward the end surface 62 of the grass clippings container 60. The downstream opening 122 of the grass clippings discharge passage 12 is downstream of the extension portion 73. The extension portion 73 has, for example, a polygonal cylindrical shape that is separated from the body portion 10 and has a bellows mechanism 730.

The extension portion 73 is provided in a position where an operation portion 74 can be operated by an operator. The operation portion 74 is, for example, a rack and pinion mechanism, which includes a rack gear 741 extending along the extension portion 73 having a polygonal cylindrical shape, a pinion gear 742 provided on an upper surface of the body portion 10, and a rotation lever 743 that rotates the pinion gear 742.

When the operator of the lawn mower 1 rotates the rotation lever 743 of the operation portion 74, the extension portion 73 of the grass clippings discharge passage 12 expands and contracts in the rotation direction. In the present embodiment, when the operator of the lawn mower 1 rotates the rotation lever 743 of the operation portion 74 clockwise as viewed from above, the extension portion 73 of the grass clippings discharge passage 12 expands, the downstream opening 122 of the grass clippings discharge passage 12 slides rearward, and a distance between the downstream opening 122 of the grass clippings discharge passage 12 and the end surface 62 of the grass clippings container 60 decreases. When the operator of the lawn mower 1 rotates the rotation lever 743 of the operation portion 74 counterclockwise as viewed from above, the extension portion 73 of the grass clippings discharge passage 12 contracts, and the downstream opening 122 of the grass clippings discharge passage 12 slides forward, so that the distance between the downstream opening 122 of the grass clippings discharge passage 12 and the end surface 62 of the grass clippings container 60 increases. In this way, the slide device 70 can adjust the distance between the downstream opening 122 of the grass clippings discharge passage 12 and the end surface 62 of the grass clippings container 60 by expanding and contracting the extension portion 73 of the grass clippings discharge passage 12.

Grass clippings cut by the cutter blade 50 fly by a turning flow due to rotation of the cutter blade 50 and are ejected from the downstream opening 122 of the grass clippings discharge passage 12. Accordingly, grass clippings ejected from the downstream opening 122 of the grass clippings discharge passage 12 are likely to be unevenly distributed in the vicinity of the downstream opening 122 of the grass clippings discharge passage 12 in the grass clippings container 60.

Figure 7A:
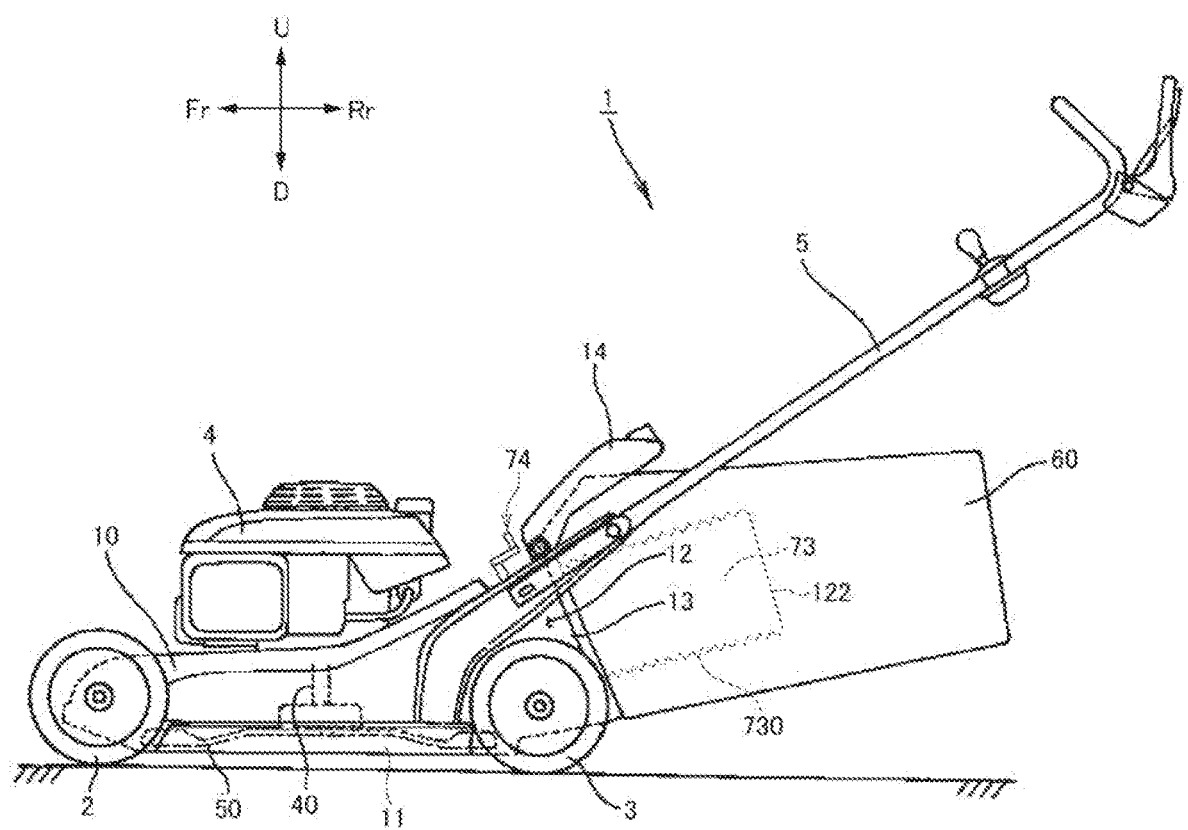
FIG. 7A is a left view of the lawn mower according to the second embodiment of the present invention in a state in which a grass clippings container is substantially empty.

As shown in FIG. 7A, grass clippings are little contained in the grass clippings container 60 immediately after the lawn mower 1 starts operating and the grass clippings container 60 is almost empty. At this time, the rotation lever 743 of the operation portion 74 is rotated clockwise as viewed from above and the downstream opening 122 of the grass clippings discharge passage 12 is slid rearward, so that the distance between the downstream opening 122 of the grass clippings discharge passage 12 and the end surface 62 of the grass clippings container 60 is adjusted to decrease.

In this way, grass clippings ejected from the downstream opening 122 of the grass clippings discharge passage 12 are accumulated in the vicinity of the end surface 62 of the grass clippings container 60.

In the present embodiment, a cross-sectional area of the grass clippings discharge passage 12 in the extension portion 73 is substantially the same from upstream of the extension portion 73, that is, from the rear surface of the body portion 10 to the downstream opening 122. The cross-sectional area of the grass clippings discharge passage 12 may also gradually decrease from upstream of the extension portion 73, that is, from the rear surface of the body portion 10, toward the downstream opening 122. In this way, a flow velocity of grass clippings passing through the extension portion can be increased and accordingly grass clippings can fly far away from the downstream opening of the grass clippings discharge passage.

Figure 7B:
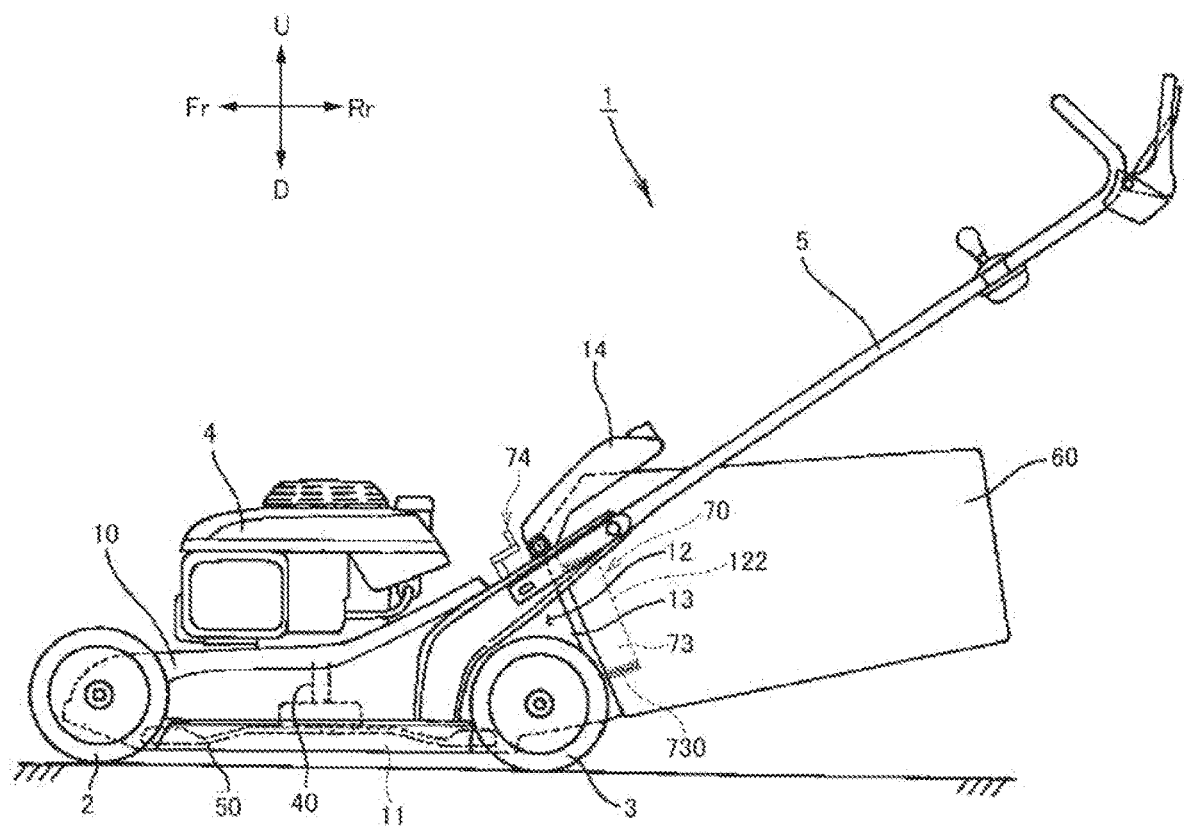
FIG. 7B is a left view of the lawn mower according to the second embodiment of the present invention in a state in Which grass clippings are contained in the grass clippings container.

When the amount of grass clippings contained in the vicinity of the end surface 62 of the grass clippings container 60 increases, as shown in FIG. 7B, the rotation lever 743 of the operation portion 74 is rotated counterclockwise as viewed from above and the downstream opening 122 of the grass clippings discharge passage 12 is slid forward, so that the distance between the downstream opening 122 of the grass clippings discharge passage 12 and the end surface 62 of the grass clippings container 60 increases.

Accordingly, since the downstream opening 122 of the grass clippings discharge passage 12 is far from the end surface 62 of the grass clippings container 60, the amount of grass clippings are still not accumulated so much in the vicinity of the downstream opening 122 of the grass clippings discharge passage 12 in the grass clippings container 60. Then, grass clippings ejected from the downstream opening 122 of the grass clippings discharge passage 12 starts to accumulate in the vicinity of the downstream opening 122 of the grass clippings discharge passage 12 in the grass clippings container 60.

When the amount of grass clippings accumulated in the vicinity of the downstream opening 122 of the grass clippings discharge passage 12 in the grass clippings container 60 increases, the rotation lever 743 of the operation portion 74 is further rotated counterclockwise as viewed from above and the downstream opening 122 of the grass clippings discharge passage 12 is further slid forward, so that the distance between the downstream opening 122 of the grass clippings discharge passage 12 and the end surface 62 of the grass clippings container 60 is further increased.

Accordingly, since the downstream opening 122 of the grass clippings discharge passage 12 is farther from the end surface 62 of the grass clippings container 60, the amount of grass clippings are still not accumulated so much in the vicinity of the downstream opening 122 of the grass clippings discharge passage 12 in the grass clippings container 60. Then, grass clippings ejected from the downstream opening 122 of the grass clippings discharge passage 12 starts to accumulate in the vicinity of the downstream opening 122 of the grass clippings discharge passage 12 in the grass clippings container 60.

In this way, as the amount of grass clippings contained in the grass clippings container 60 increases, the distance between the downstream opening 122 of the grass clippings discharge passage 12 and the end surface 62 of the grass clippings container 60 is adjusted to gradually increase. Accordingly, grass clippings ejected from the downstream opening 122 of the grass clippings discharge passage 12 can accumulate forward from the end surface 62 of the grass clippings container 60.

Accordingly, uneven distribution of grass clippings contained in the grass clippings container 60 can be reduced in the vicinity of the opening 61 of the grass clippings container 60.

Since the distance between the downstream opening 122 of the grass clippings discharge passage 12 and the end surface 62 of the grass clippings container 60 can be adjusted by the operator of the lawn mower 1 rotating the rotation lever 743, the distance between the downstream opening 122 of the grass clippings discharge passage 12 and the end surface 62 of the grass clippings container 60 can be adjusted according to preferences of the operator.

Although in the present embodiment, the distance between the downstream opening 122 of the grass clippings discharge passage 12 and the end surface 62 of the grass clippings container 60 is adjusted by the operator of the lawn mower 1 rotating the rotation lever 743, the slide device 70 may also be interlocked with the pair of left and right front wheels 2 and/or the pair of left and right rear wheels 3 such that the end surface 62 of the grass clippings container 60 may be moved in the front-rear direction. For example, the pinion gear 742 of the operation portion 74 may be connected to a shaft of the rear wheels 3 of the lawn mower 1 via a speed reduction mechanism (not shown). In this way, the distance between the downstream opening 122 of the grass clippings discharge passage 12 and the end surface 62 of the grass clippings container 60 can be adjusted without the operation of the operator.

The lawn mower 1 may include an electric motor (not shown) such that the pinion gear 742 of the operation portion 74 of the slide device 70 may be driven by the electric motor. In this way, since the distance between the downstream opening 122 of the grass clippings discharge passage 12 and the end surface 62 of the grass clippings container 60 can be adjusted independently of the operation of the operator, the distance between the downstream opening 122 of the grass clippings discharge passage 12 and the end surface 62 of the grass clippings container 60 can be adjusted in accordance with, for example, an accumulated traveling distance and drive time of the lawn mower 1.

Although the embodiments of the present invention have been described above, the present invention is not limited thereto and modifications, improvements, or the like can be made as appropriate.

For example, the lawn mower 1 may include a power transmission device between the engine 4 and the rear wheels 3 and the rear wheels 3 may be driven by the engine 4.

For example, although the engine 4 is used as the power source in the lawn mower 1, an electric motor may be used as the power source.

For example, although the lawn mower 1 is assumed to be moved by the operator operating the operation handle 5, the lawn mower 1 may be moved by a remote operation of the operator or be automatically moved by autonomous control.

For example, although the lawn mower 1 includes the output shaft 40 extending substantially vertically downward from the engine 4 and the cutter blade 50 is provided at the lower end of the output shaft 40, the lawn mower 1 may include a rotation shaft connected to the output shaft 40 via a gear or the like so as to transmit power, and the cutter blade 50 may be provided on the rotation shaft. Further, the rotation shaft and the output shaft 40 are not limited to the vertical direction and may be inclined by a predetermined angle from the vertical direction.

The present specification describes at least the following contents. Although corresponding constituent elements or the like in the above embodiments are shown in parentheses, the present invention is not limited thereto.

(1) A lawn mower (lawn mower 1) includes:
a power source (engine 4);
a rotation shaft (output shaft 40) configured to be rotated by power of the power source;
a cutter blade (cutter blade 50) configured to be rotated by the rotation shaft so as to cut grass;
a body portion (body portion 10) including a housing (housing 11) containing the cutter blade, and a grass clippings discharge passage (grass clippings discharge passage 12) configured to discharge grass clippings cut by the cutter blade from the housing;
a grass clippings container (grass clippings container 60) detachably attached to the body portion and configured to contain grass clippings; and
a slide device (slide device 70),
wherein the grass clippings discharge passage includes:
an upstream opening (upstream opening 121) connected to the housing; and
a downstream opening (downstream opening 122) for ejecting grass clippings to outside of the body portion, wherein the grass clippings container
is provided to cover the downstream opening of the grass clippings discharge passage,
includes an opening (opening 61) opened toward the body portion and connected to the body portion, an end surface (end surface 62) facing the opening, and a side surface (side surface 63) extending from the opening to the end surface, and
is configured to contain grass clippings ejected from the downstream opening of the grass clippings discharge passage, and
wherein the slide device is configured to adjust a distance between the downstream opening of the grass clippings discharge passage and the end surface of the grass clipping container.

According to (1), the distance between the downstream opening of the grass clippings discharge passage and the end surface of the grass clippings container can be adjusted by the slide device. Accordingly, as the amount of grass clippings contained in the grass clippings container increases, the distance between the downstream opening of the grass clippings discharge passage and the end surface of the grass clippings container is adjusted to gradually increase. Accordingly, uneven distribution of grass clippings can be reduced in the vicinity of the opening of the grass clippings container. Further, grass clippings can be ejected to the vicinity of the end surface of the grass clippings container without increasing a rotation speed of the cutter blade, and thus noise can be reduced and energy consumption can be reduced.

(2) In the lawn mower according to (1),
the slide device includes an expandable portion (expandable portion 71) provided on the side surface of the grass clippings container and configured to expand and contract the grass clippings container, and
the expandable portion is configured to expand and contract to adjust the distance between the downstream opening of the grass clippings discharge passage and the end surface of the grass clippings container.

According to (2), the slide device includes the expandable portion provided on the side surface of the grass clippings container and configured to expand and contract the grass clippings container, and the distance between the downstream opening of the grass clippings discharge passage and the end surface of the grass clippings container can be adjusted by expanding and contracting the expandable portion. Accordingly, the distance between the downstream opening of the grass clippings discharge passage and the end surface of the grass clippings container can be adjusted with a simple structure.

(3) In the lawn mower according to (1),
the slide device includes an expandable extension portion (extension portion 73) provided in the grass clippings discharge passage such that the downstream opening expands toward the end surface of the grass clippings container, and the extension portion in the grass clippings discharge passage is configured to expand and contract to adjust the distance between the downstream opening of the grass clippings discharge passage and the end surface of the grass clippings container.

According to (3), the slide device includes the expandable extension portion provided in the grass clippings discharge passage such that the downstream opening expands toward the end surface of the grass clippings container, and the distance between the downstream opening of the grass clippings discharge passage and the end surface of the grass clippings container can be adjusted by expanding and contracting the extension portion. Accordingly, the distance between the downstream opening of the grass clippings discharge passage and the end surface of the grass clippings container can be adjusted with a simple structure.

(4) In the lawn mower according to any one of (1) to (3), the slide device is configured to be driven by operation of an operator.

According to (4), the distance between the downstream opening of the grass clippings discharge passage and the end surface of the grass clippings container can be adjusted by operation of an operator. Accordingly, the distance between the opening and the end surface of the grass clippings container can be adjusted according to preferences of the operator.

(5) The lawn mower according to any one of (1) to (3), further includes:
a wheel (rear wheels 3),
wherein the slide device is configured to be driven while interlocking with rotation of the wheel.

According to (5), the slide device is configured to be driven while interlocking with rotation of the wheel of the lawn mower. Accordingly, the distance between the downstream opening of the grass clippings discharge passage and the end surface of the grass clippings container can be adjusted without operation of the operator.

(6) The lawn mower according to any one of (1) to (3), further includes:
an electric motor,
wherein the slide device is configured to be driven by the electric motor.

According to (6), the slide device is configured to be driven by the electric motor. Accordingly, the distance between the downstream opening 122 of the grass clippings discharge passage 12 and the end surface 62 of the grass clippings container 60 can be adjusted independently of operation of the operator. Therefore, the distance between the downstream opening of the grass clippings discharge passage and the end surface of the grass clippings container can be adjusted in accordance with, for example, a traveling distance and drive time of the lawn mower.

The invention claimed is:

1. A lawn mower comprising:
a power source;
a rotation shaft configured to be rotated by power of the power source;
a cutter blade configured to be rotated by the rotation shaft so as to cut grass;
a body portion including a housing containing the cutter blade, and a grass clippings discharge passage configured to discharge grass clippings cut by the cutter blade from the housing;
a grass clippings container detachably attached to the body portion and configured to contain grass clippings; and
a slide device,
wherein the grass clippings discharge passage includes:
an upstream opening connected to the housing; and
a downstream opening for ejecting grass clippings to outside of the body portion,
wherein the grass clippings container
is provided to cover the downstream opening of the grass clippings discharge passage,
the grass clipping container includes: an opening opened toward the body portion and connected to the body portion, an end surface facing the opening, and a side surface extending from the opening to the end surface, and
is configured to contain grass clippings ejected from the downstream opening of the grass clippings discharge passage,
wherein the slide device is configured to adjust a distance between the downstream opening of the grass clippings discharge passage and the end surface of the grass clipping container in a slidable direction perpendicular to the end surface; and
wherein the end surface is a substantially rectangular plane that is flat in a direction perpendicular to the slidable direction.

2. The lawn mower according to claim 1,
wherein the slide device includes an expandable portion provided on the side surface of the grass clippings container and configured to expand and contract the grass clippings container, and
wherein the expandable portion is configured to expand and contract to adjust the distance between the downstream opening of the grass clippings discharge passage and the end surface of the grass clippings container.

3. The lawn mower according to claim 1,
wherein the slide device includes an expandable extension portion provided in the grass clippings discharge passage such that the downstream opening expands toward the end surface of the grass clippings container, and
wherein the extension portion in the grass clippings discharge passage is configured to expand and contract to adjust the distance between the downstream opening of the grass clippings discharge passage and the end surface of the grass clippings container.

4. The lawn mower according to claim 1,
wherein the slide device is configured to be driven by operation of an operator.

* * * * *